June 26, 1962 H. E. GARRETT ET AL 3,040,464
FISHING HOOK HOLDER FOR FISHING POLES
Filed Aug. 15, 1960
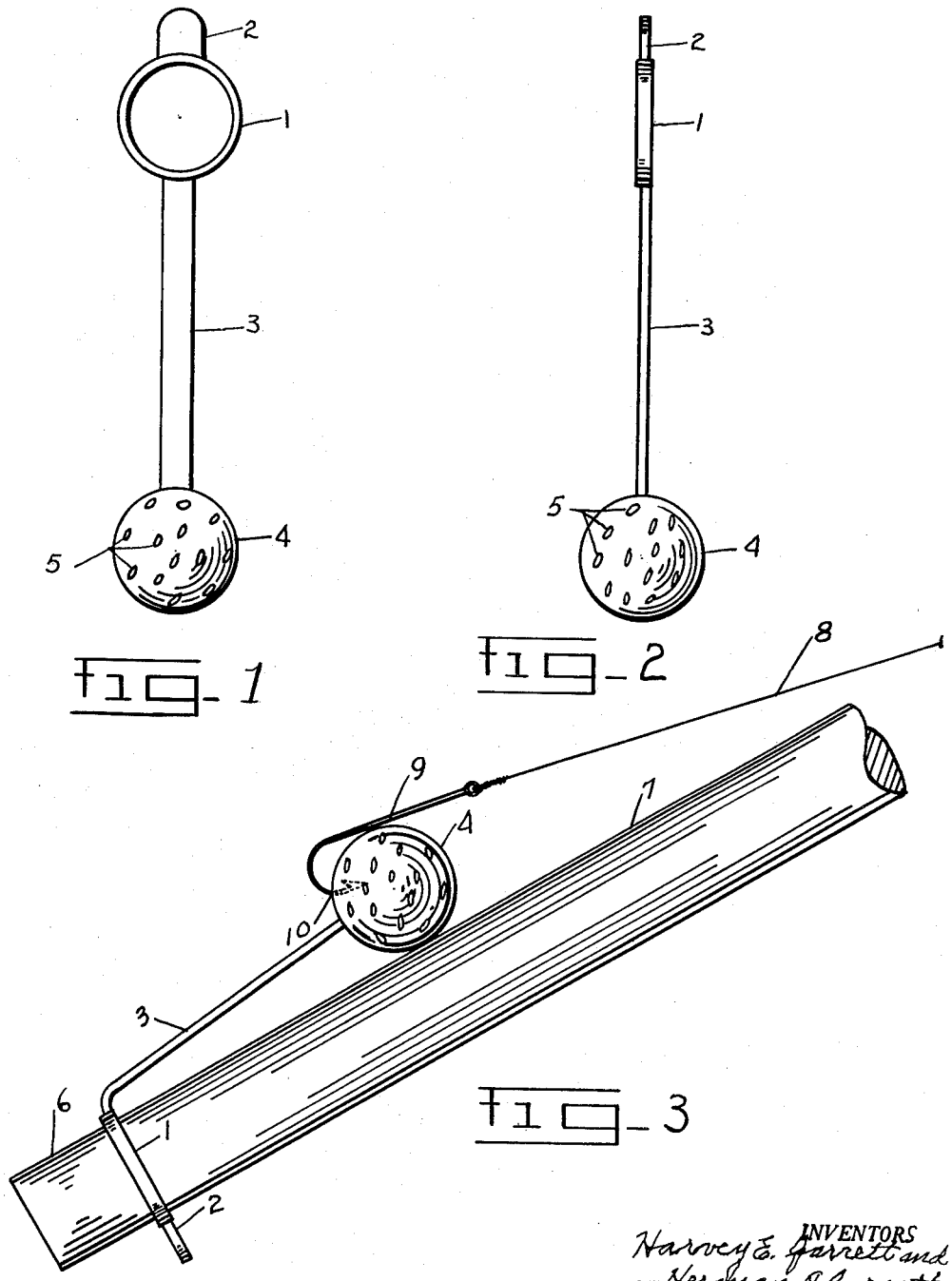
INVENTORS
Harvey E. Garrett and
BY Herman R. Garrett
Chas. Senegre
Attorney.

United States Patent Office 3,040,464
Patented June 26, 1962

3,040,464
FISHING HOOK HOLDER FOR FISHING POLES
Harvey E. Garrett and Herman A. Garrett,
both P.O. Box 113, Mulga, Ala.
Filed Aug. 15, 1960, Ser. No. 49,472
1 Claim. (Cl. 43—25.2)

This invention relates to a fishing hook holder for fishing poles. It has for its main objects to provide such a holder that will be highly satisfactory for the purpose intended, simple in structure, cheap to manufacture, easy to use, and very durable.

A hook on a fishing line when not in use fishing very often causes injury by not being protected as a matter of safety to the hands and face of the fisherman. The present holder will easily prevent such accidents.

Other objects and advantages will appear from the drawing and specification.

By referring generally to the drawing it will be observed that—

FIG. 1 is a plan view showing a hook holder made according to this invention.

FIG. 2 is a view showing the edge of the ring with tab, the connecting part, and a full view of the ball.

FIG. 3 is a side view showing the handle end portion of a fishing pole with hook holder mounted on same for use while the pole and line are not in fishing use.

Similar reference numerals refer to similar parts throughout the several views.

Referring to the drawing in detail it will be seen that the hook holder comprises a ring 1, tab 2, connecting part 3, ball 4, holes 5 in the ball.

From the foregoing it will appear that to use the hook holder the ring is placed around the end portion 6 of a fishing pole 7, then the ball is pulled toward the outer end of the pole. The outer part of the line 8 is held tight on the pole to hold the hook 9 from moving toward the inner end of the pole, then the ball is pulled toward the hook and its pointed end 10 is inserted removably in a hole in the ball. In this condition there is no danger of the hook swinging about and by accident hooking into any part of the fisherman.

The hook holder may be made of any material suitable for the purpose, but we prefer to use rubber; also it may be made in different sizes and capacities depending on the sizes of hooks and lines and poles on which to be used.

While we have shown and described the preferred embodiment of our invention, we do not wish to limit same to the exact and precise details of structure, and we reserve the right to make all modifications and changes so long as they remain within the scope of the invention and the following claim.

Having described our invention we claim:

A fishing hook holder for use on fishing poles comprising, a structure made of rubber including a ball having a plurality of holes in its outer surface, a ring, said ring having an integral tab as a handle, a connecting part which is longitudinally elongated and integrally attached by one end of the periphery of the ring with its other end integrally attached to the ball, said connecting part being of sufficient length to hold said ring and ball some distance apart, said holes in the ball being of a size for the pointed end of a fishing hook to fit removably therein.

References Cited in the file of this patent

UNITED STATES PATENTS

| | | |
|---|---|---|
| 1,162,843 | Zakim | Dec. 7, 1915 |
| 1,582,196 | Van Blarcom | Apr. 27, 1926 |
| 2,144,122 | Pflueger | Jan. 17, 1939 |
| 2,569,704 | Weiss | Oct. 2, 1951 |
| 2,802,293 | Flye | Aug. 13, 1957 |
| 2,805,510 | De Pamphilis | Sept. 10, 1957 |

FOREIGN PATENTS

| | | |
|---|---|---|
| 586,353 | France | Jan. 3, 1925 |
| 596,851 | France | Aug. 17, 1925 |